Oct. 16, 1951 W. STELZER 2,571,963
HYDRAULIC BRAKE CONTROL DEVICE
Filed July 21, 1947 2 SHEETS—SHEET 1
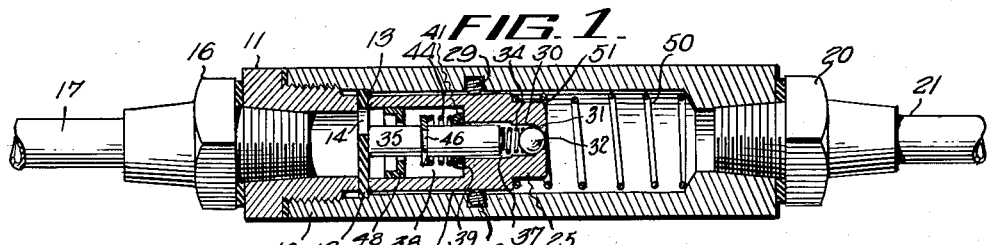
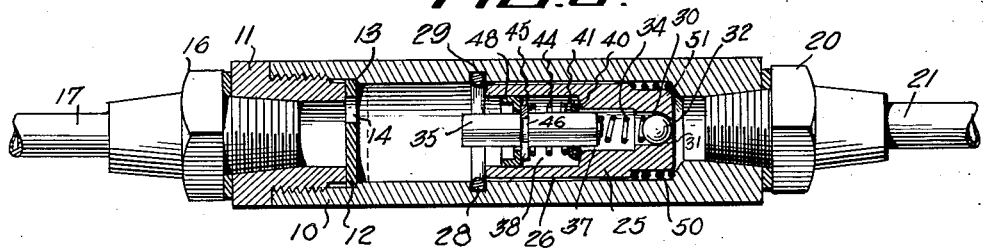
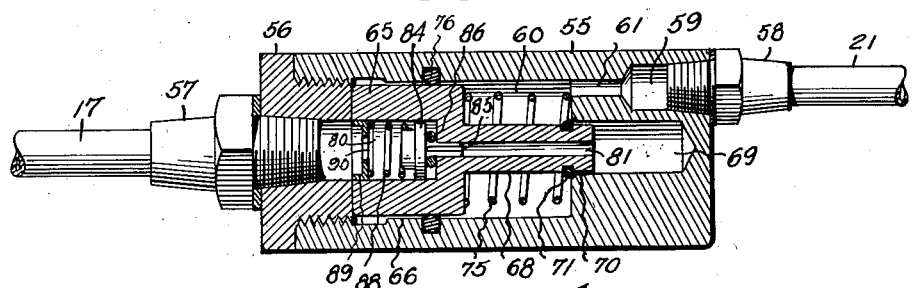
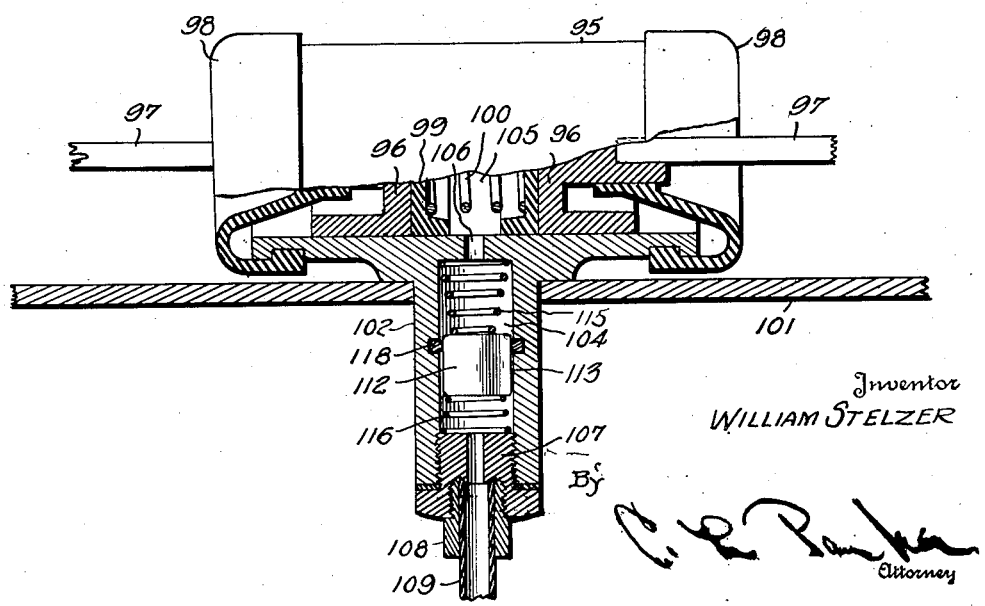
Inventor
WILLIAM STELZER

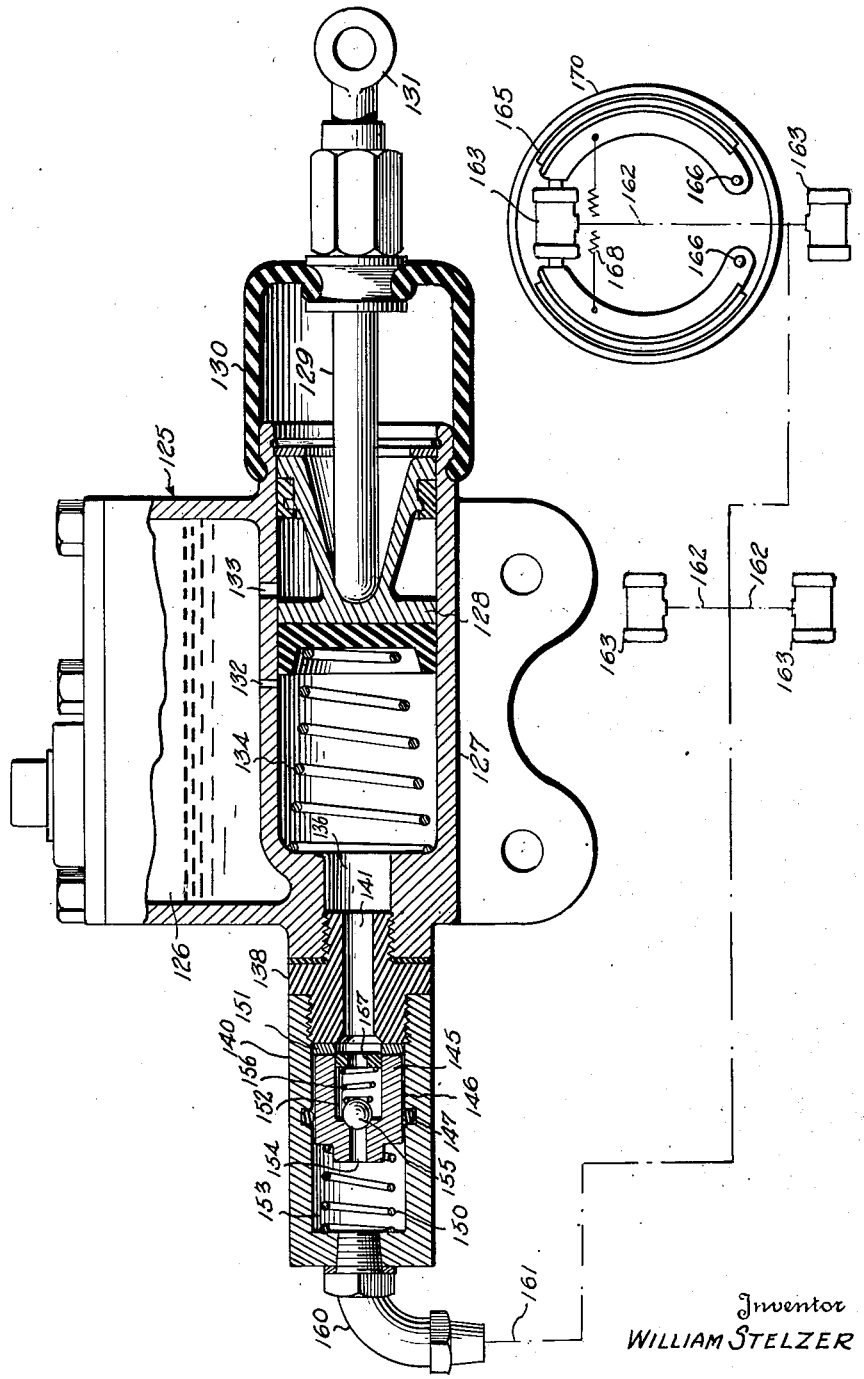

Patented Oct. 16, 1951

2,571,963

UNITED STATES PATENT OFFICE 2,571,963

HYDRAULIC BRAKE CONTROL DEVICE

William Stelzer, Summit, N. J., assignor to Empire Electric Brake Company, Newark, N. J., a corporation of New Jersey Application July 21, 1947, Serial No. 762,372

8 Claims. (Cl. 188—152)

This invention relates to a hydraulic brake control mechanism, and more particularly to a device for automatically adjusting hydraulically operated vehicle brakes.

In the conventional vehicle hydraulic brake system, a master cylinder is operative for forcing hydraulic fluid through the brakes lines to actuate wheel cylinders to apply the brakes. The brake shoes are normally held out of operative position against suitable stops by the action of relatively strong return springs, and the brake shoes move to such positions when the brake pedal is released. For reasons well known in the art it is the customary practice to provide adjacent the outlet of the master cylinder a residual pressure valve which is operative under normal conditions for maintaining a residual pressure in the brake lines of from 10 to 12 pounds per square inch. The brake shoe return springs, when the brake pedal is released, move the brake shoes into engagement with the stops and force fluid to return through the brake lines to the master cylinder. As soon as the pressure in the brake lines drops to the predetermined pressure for which the residual pressure valve is designed, such valve automatically closes to retain the pressure referred to in the brake lines.

Because of the use of stops for limiting movement of the brake shoes to "off" positions, it will be obvious that when the brakes are released, the shoes return to predetermined "off" position. As the brake shoes wear, the distance through which they must move to contact the brake drums, progressively increases, and accordingly it is necessary from time to time to adjust the brakes of a motor vehicle due to the wearing of the brake shoes. As wear takes place, it requires the introduction of increasing amounts of fluid into the brake cylinders of hydraulic brakes to effect full brake engagement, the brake shoes returning in a conventional device to the same normal position at each brake releasing operation.

It has been proposed to provide automatic adjusting devices which predetermine and limit movement of the brake shoes away from applied position whereby, regardless of brake wear, the displacement of fluid from the master cylinder or brake booster into the brake cylinders to apply the brakes will always be the same. Such devices, of which I am aware, are mechanical in type and are associated with the vehicle brake shoes and operate through the medium of ratchets, friction engaging surfaces, etc., to limit the movement of the brake shoes away from applied position.

Mechanical devices of the character referred to for automatically adjusting vehicles brakes are relatively complicated and expensive to manufacture, and substantial expense is involved in the installation of the devices as accessories, and in the assembling of the brake mechanisms where vehicles are factory-equipped with such devices. Moreover, in installations where it is necessary to apply the brakes of vehicles for relatively long periods of time, the brake drums expand substantially and consequently contract to a substantial extent when cooling. With mechanical brake adjusting devices of the character referred to, the releasing movement of the brake shoes is always the same, and where substantial drum expansion has occured, followed by the substantial contraction which takes place when the drums cool, the drums contract into frictional engagement with the shoes and cause excessive and needless wear.

The disadvantage of prior brake adjusting mechanisms of which I am aware is aggravated by the fact that relative strong brake shoe return springs are employed, and the devices previously used for predetermining the distance of movement of the shoes away from the drums had to overcome the substantial tension of the return springs. Where contraction of the drum into engagement of the shoe occurs, therefore, adjusting devices of the character referred to will hold the brake shoes against the drum under substantially greater pressure than that which could be exerted by the conventional residual pressure, acting alone.

An important object of the present invention is to provide a simple and novel device for effecting adjustment of hydraulic brakes and wherein the device is connected in a hydraulic brake line to control the movement of brake fluid instead of being arranged in direct association with the brakes themselves.

A further object is to provide a device of this character which permits the flow to the brakes of whatever fluid is necessary for full brake application, thus compensating for possible leakage, but wherein the device limits the return flow of brake fluid, thus limiting movement of the brake shoes away from the drums.

A further object is to provide such a device which is not only cheaper to manufacture and install than mechanical brake adjusters, but which can be connected into a fluid brake line at any desired or convenient point.

A further object is to provide such a device which may be utilized in conjunction with the fluid line leading to each individual wheel brake, or which may be placed in or adjacent the outlet of the master cylinder or in or adjacent the outlet of a power booster mechanism, thus rendering it necessary to use only a single brake adjuster for all of the wheels of the vehicle.

A further object is to provide a device of the character described which possesses all of the characteristics of a residual pressure valve, thus permitting the use of the device in conjunction with a master cylinder with the residual pressure valve omitted therefrom.

A further object is to provide a brake control device which permits the use of substantially weaker brake shoe return springs and transfers to such springs the function of generating and predetermining the residual pressure in the system while at the same time preventing an artificial increase in pressure in the system under "off" brake conditions, thus preventing the brake shoes from engaging the brake drums under any conditions except during brake application with a pressure in excess of that which would be caused by the normal relatively low residual pressure.

A further object is to provide a hydraulic brake adjuster of the type referred to which functions automatically to release any pressure in the brake cylinders above the usual residual pressure, thus preventing excessive friction between the brake shoes and drums if the latter contract substantially after having been expanded through relatively long continued use.

Other objects and advantages of the invention will become apparent during the course of the following description. In the drawings I have shown several embodiments of the invention. In this showing Figure 1 is a central longitudinal sectional view through one form of the device shown in the brake-released condition, parts being shown in elevation;

Figure 2 is a similar view showing the parts of the device in the positions they will occupy in the maximum brake-applied positions;

Figure 3 is a similar view of a modified form of the device, shown in the fully released position;

Figure 4 is a similar view showing a further modification of the device directly associated with a brake cylinder, parts being shown in elevation and the brake cylinder being broken away; and Figure 5 is a view of an additional modification directly connected to the master cylinder of the brake system with the usual residual pressure valve omitted from the master cylinder.

Referring to Figure 1, the numeral 10 designates a relatively small cylinder having a fitting 11 tapped into one end thereof and seating against a plate 12 engaging a shoulder 13 in the cylinder 10. The plate 12 is provided with an off-center opening 14 for the flow of brake fluid, in a manner to be described.

A union 16 is connected in the end of the fitting 11 and is mounted on the end of the fluid inlet pipe 17 for the device. As will be further referred to in detail later, the pipe 17 may be the hydraulic supply line for an individual brake; it may be the outlet pipe of the vehicle master cylinder; or it may be the outlet pipe of a power booster brake mechanism. The opposite end of the cylinder is connected through a union 20 to an outlet pipe 21. If the pipe 17 is an individual brake pipe, the pipe 21 will lead to an individual brake cylinder. If the pipe 17 is connected to the outlet of the master cylinder or a power booster brake mechanism, the pipe 21 will be the main supply line for all of the brakes and will be provided with the usual branch pipes.

A plunger 25 is slidable in the cylinder 10 and fits relatively loosely therein so as to provide a slight clearance space 26 for the passage past the plunger 25 of brake fluid under conditions to be described. The clearance 26 and the corresponding clearances in the other figures of the drawing have been exaggerated for the purpose of illustration. A conventional O ring 28 is arranged in a recess 29 in the cylinder 10 and acts as a seal to prevent flow of fluid past the plunger 25 except when the latter is in the fully applied brake position of Figure 2, to be referred to later.

The plunger 25 is provided in one end with an axial bore 30 terminating in a valve seat 31 normally engaged by a ball check valve 32. This valve is normally seated by one end of a very light spring 34 the opposite end of which engages a projection on a small axial plunger 35. The opposite end of this plunger engages the plate 12 in the off-brake position.

The bore 30 communicates with a larger bore 37 which, in turn, communicates with a relatively large axial bore 38 in the plunger 25. The bores 37 and 38 form a shoulder 39 engageable by an O ring 40 arranged in a cup 41. The ring 40 also acts as a check valve and is normally seated by engagement with one end of a spring 44 having its opposite end engaging a spring seat 45 in the form of a snap ring carried by the small plunger 35 and having a gap 46 therein for the passage of fluid therethrough under certain conditions. The ring 45, under conditions to be described, engages a seat 48 having a pressed fit in the bore 38.

As previously stated, the parts of the device are shown in the off-brake position in Figure 1. To normally retain the parts in such position a return spring 50 is arranged in the cylinder 10 and surrounds an axial projection 51 on the plunger 25.

As will be further described below in conjunction with Figure 5 wherein a modified form of the invention is shown in a complete braking system, the device shown in Figures 1 and 2 is adapted to control the flow of brake fluid through the brake lines to conventional brake cylinders which operate the brake shoes having relatively weak return springs, and it is the latter springs which generate the residual pressure which acts back through the line 21 when the brakes are released. These general features of applicant's brake control system will become fully apparent later.

In the form of the device shown in Figure 3, a cylinder 55 is provided at one end with a fitting 56 attached thereinto and connected by a union 57 to the inlet pipe 17, corresponding to the inlet pipe previously described. The outlet pipe 21, in this case, is connected by a union 58 to an off-center bore 59 communicating with the interior chamber 60 of the cylinder 55 through a passage 61.

A plunger 65 is slidable in the cylinder 55 and is very slightly smaller in diameter than the interior of the cylinder to provide a clearance or leakage space 66 for a purpose to be described. The body of the plunger 65, as is true of the plunger 25, has its corners preferably slightly rounded. The plunger 65 carries an axial extension 68 slidable in a reduced bore 69. The extension 68 is very slightly smaller than the diameter of the bore 69 to provide a slight clearance space 70 when the parts are in the off-brake position shown in Figure 3. As soon as brake application is to be initiated by movement of the plunger 65 to the right, as shown in Figure 3, the passage of fluid through the space 70 is prevented by engagement of an O ring 71 with the walls of the bore 69, the ring 71 being carried by the plunger extension 68 and normally slightly spaced from the adjacent end of the chamber 60.

The plunger 65 is urged to the off-brake position by a return spring 75. During the greater portion of the movement of the plunger 65 the flow of brake fluid through the clearance 66 is prevented by an O ring 76. However, when the plunger 65 is moved to the right to its extreme brake-applying position, the left hand end of the plunger 65, as viewed in Figure 3, slightly clears the O ring 76 to permit the flow of fluid through the clearance 66. In the fully "on" position of the brakes, the plunger 65 occupies with respect to the O ring 76 a position corresponding to the position of the plunger 25 with respect to the ring 28 in Figure 2, as will be further described later.

The plunger 65 is provided in one end with a relatively large bore 80 communicating with one end of a small bore 81 opening into the cylinder bore 69. A relief valve body 84 is mounted in the bore 80 and is provided with an axially projecting stem 85 mounted in the bore 81 and of non-circular construction or smaller than the bore 81 so as not to interfere with the passage of fluid therethrough under conditions to be described. The valve body 84 engages an O ring 86 to tend to hold the latter against the adjacent end of the bore 80 to act as a check valve relative to the bore 81. A spring 88 urges the valve body 84 to the right, as viewed in Figure 3, and has one end engaging a seat 89 pressed into the bore 80 and provided with an opening 90.

A further and simplified form of the device is illustrated in Figure 4 in direct connection with one of the wheel cylinders. The wheel cylinder and associated elements are conventional, except that substantially weaker than the usual brake shoe return springs are employed and the stops for limiting return movement of the brake shoes are eliminated. The brake cylinder mechanism in Figure 4 comprises a cylinder 95 having pistons 96 therein connected by rods 97 to the brake shoes in the usual manner, the ends of the cylinder 95 being provided with the usual boots 98. The inner ends of the pistons 96 are provided with seals 99 engaged by a spring 100 to hold the seals 99 in position.

The cylinder 95 is carried by the brake plate, a portion of which is illustrated in Figure 4 and indicated by the numeral 101. The cylinder 95 is provided with a laterally extending cylinder 102 shown in the present instance as being integral with the cylinder 95. The cylinder 102 has a bore 104 communicating with the chamber 105 between the pistons 96 through a passage 106.

A fitting 107 is threaded in the end of the cylinder 102 remote from the cylinder 95 and is connected by a union 108 to a hydraulic fluid supply line 109.

A round cornered plunger 112 is mounted in the cylinder 102 and is of slightly smaller diameter than the internal diameter of the cylinder 102 to provide a slight clearance space 113. The plunger 112 is arranged between volute springs 115 and 116. The plunger 112 is not positively limited in its movement, and the spring 116 has a higher rate than the spring 115 to limit its free height. The plunger 112 occupies the off-brake position shown in Figure 4, and the passage of fluid through the clearance space 113 is normally prevented by an O ring 118. When the brakes are fully applied, the plunger bodily moves slightly beyond the O ring 118, that is, upwardly past such ring, as viewed in Figure 4, thus corresponding to the brake-applied position of the plunger 25 in Figure 2.

In Figure 5 of the drawings a still further modification of the invention has been shown, this time in conjunction with a master cylinder, with the wheel cylinders and the brake elements associated with one such cylinder diagrammatically represented. The purpose of Figure 5 is not only to show a modified form of the present invention, but also to fully illustrate how it can be used in conjunction with the master cylinder to function not only as a brake adjuster but also as a residual pressure valve, thus eliminating necessity for the use of a conventional residual pressure valve in the master cylinder. The cost of the installation in Figure 5, therefore, is little, if any, higher than a conventional hydraulic brake system since the use of a conventional residual valve is eliminated.

In Figure 5 the master cylinder as a whole is indicated by the numeral 125 and includes the usual reservoir 126 and cylinder 127 in which is arranged a conventional piston 128 operated in the usual manner by a rod 129 extending through a boot 130 and having an adjustable eye 131 for connecting the rod 129 to the brake pedal. The bottom wall of the reservoir is provided with the usual fluid openings 132 and 133, and a return spring 134 tends to hold the piston 128 in its normal position.

The cylinder 127 is provided with the usual outlet bore 136 from which the conventional residual pressure valve has been omitted. A fitting 138 is tapped into the opening 136 and is connected to and supports the cylinder 140 of the present device. The fitting 138, of course, is provided with an axial passage 141 for the flow of brake fluid from the master cylinder into the cylinder 140 when the brakes are applied.

A plunger 145 is slidable in the cylinder 140 and its external diameter is slightly smaller than the internal diameter of the cylinder 140 to provide a clearance or leakage space 146. In the normal position of the parts in Figure 5, and throughout the greater portion of the movement of the plunger 145, leakage through the clearance 146 is prevented by an O ring 147 in the cylinder 140.

In the outer end of the cylinder 140 is arranged a compression spring 150 which urges the plunger 145 toward its normal position shown in Figure 5 in contact with a washer 151. The plunger 145 is provided with a chamber 152 communicating with the chamber 153 in the end of the cylinder 140. Communication between the chambers 152 and 153 takes place through a passage 154 normally closed by a ball valve 155 urged to closed position by a spring 156. This spring seats against a washer 157 having a pressed fit in the end of the chamber 152.

The outer end of the cylinder 140 is provided with a suitable fitting 160 through which the chamber 153 communicates with one end of the usual hydraulic fluid line 161 which branches as at 162 for communication with the individual brake cylinders 163.

In Figure 5 the preferred arrangement in certain respects of elements associated with one vehicle wheel has been illustrated. It obviously is preferred that the same arrangement be employed for all of the wheels. One of the brake cylinders 163 is illustrated as having its pistons operable for actuating conventional brake shoes 165 pivoted at their lower ends as at 166. These brake shoes are urged away from brake-applied positions by a return spring 168, shown broken away so as not to interfere with a clear showing of the branch line 162 leading to the associated wheel cylinder 163. Obviously, two springs may be employed, one for each brake shoe, but it will be apparent that a single spring for each pair of brake shoes is preferred. It also will become apparent for the reason referred to below that the springs 168 of the several wheels of each vehicle be as nearly identical in function as possible. The brake shoes are movable into engagement with a conventional brake drum 170.

Operation

Referring to Figures 1 and 2, it will be understood that the pipe 17 may be directly connected to the master cylinder or to the outlet of a booster brake mechanism, in which case the present device will be located in the main supply line corresponding to the line 161 in Figure 5. Accordingly the pipe line 21 will be branched in the same manner as the pipes 162 in Figure 5 for connection with the individual wheel cylinders, preferably associated with the parts described in connection with Figure 5. If desired, one of the devices may be located in each branch line leading to a wheel cylinder, but this has been found to be unnecessary in practice, only one of the devices being required.

The device, of course, will always be filled with brake fluid and the parts will normally occupy the positions shown in Figure 1. When the brakes are to be applied, hydraulic fluid is forced through pipe 17 and through opening 14 into the adjacent end of the cylinder 10. The valve 32 being closed, the plunger 25 will start to move toward the right. The O ring 28 will seal the plunger 37 and cylinder 10 and prevent leakage of fluid past the plunger.

The plunger 25 accordingly will move toward the right in Figure 1, displacing fluid through the pipe 21 at the same rate that fluid is introduced into the inlet end of the cylinder 10. If maximum brake application takes place, the plunger 25 will move to the position shown in Figure 2 at which point the rear end of the plunger 25 barely clears the O ring 28. Since reasonable clearance exists between the plunger 25 and the inner wall of the cylinder 10, any fluid thereafter necessary for fully applying the brakes will flow around the plunger 25. Particular attention is invited to the fact, therefore, that in applying the brakes the plunger 25 does not limit the amount of fluid which can flow into the brake cylinders to effect brake application.

It may be noted that in a brake application where the amount of fluid transmitted through pipe 17 is greater than the amount of fluid displaced by the plunger 25, the latter does not necessarily have to move the full distance to a positive stop against the right hand end of the bore of the cylinder 10 as viewed in Figures 1 and 2. On the contrary, it moves only a sufficient distance to clear the O ring 28 to permit the passage of fluid around the plunger. As soon as the flow of fluid stops, the plunger, acting as a valve in cooperation with the O ring 28, assumes a lap position.

Immediately upon the releasing of the brake pedal, the pressure existing in the pipe line 21 and accordingly in the outlet end of the cylinder 10 will start the plunger 25 on its return movement. The plunger 25 continues its return movement to its normal position shown in Figure 1 and in so doing, measures the quantity of hydraulic brake fluid which is permitted to return to the device through the line 21. This operation consequently predetermines the movement of the brake shoes away from the brake drum and prevents the brake shoes from returning to any predetermined position as is true in conventional practice. Under the latter practice, the distance which the brake shoes must move into braking engagement with the drums increases progressively as the brake shoes wear. With the present device, the brake shoes move a predetermined distance from fully applied position rather than to a predetermined normal position. The normal position of the brake shoes accordingly progressively moves as the brake shoes wear, thus making it unnecessary to effect periodic adjustment of the parts as is the customary practice.

The return springs of the brake shoes are tensioned to provide for the generation of a predetermined residual pressure in the brake lines. The spring 44 (Figures 1 and 2) resists a slightly greater hydraulic pressure than that produced by the return spring 168. The spring 34 is relatively weak, being only sufficiently strong to seat the valve 32, the latter serving merely in the nature of a pump check valve in a manner described below.

In the normal functioning of the apparatus, the retraction of the plunger 25 to its normal position as in Figure 1 withdraws fluid through the line 21, freeing the brake return spring 168 to move the brake shoes away from the drums. The fixed return movement of the plunger 25 determines the distance of movement of the brake shoes away from the drums and the tension of the spring 168 of each wheel brake mechanism determines the residual pressure in the system.

Assuming that the vehicle has been descending along a mountain road and frequent application of the brakes has been necessary, the brake drums 170 will become heated and will expand radially. Assuming that the vehicle is now at the bottom of such mountain and the brakes are released, the brake shoes will move a predetermined distance from the drums and will remain in such positions. Contraction of the drums, upon cooling, may bring the drums into frictional engagement with the brake shoes. If this occurs, the brake shoes will move inwardly and will exert pressure on the pistons of the brake cylinders to displace fluid back through the pipe lines. Under such conditions both of the valves 32 and 40 (Figures 1 and 2) will open to relieve such pressure and permit fluid to flow back to the master cylinder, through the booster brake mechanism if the device is used with such mechanism.

While the springs 168 predetermine the residual pressure in the system, the valve 40 is adapted to open at only a slightly higher pressure, and accordingly under the extreme conditions just described the present device prevents the generation of pressure in the system substantially above a relatively low residual pressure. Accordingly excessive frictional engagement between the brake shoes and brake drums is prevented under any conditions.

It has been stated above that the amount of fluid withdrawn from the brake cylinders at each releasing of the brakes is determined by the retractile stroke of the plunger 25 in the cylinder 10. Thus, after the brake drums have contracted due to cooling, or the hydraulic fluid is expanded in the brake lines due to heating, the brake applying stroke of the plunger 25 is reduced to the point where the latter does not move beyond the ring 28 and consequently less than the normal amount of fluid will be displaced through the line 21. Consequently, in the retractile movement of the plunger 25 an equally reduced amount of brake fluid is released from the brake cylinders by such movement of the plunger 25. In order to establish the proper adjustment of the brakes, as when the full displacement of fluid by the plunger 25 is released from the brake cylinder, provision is made in the form of the pumping device including the plunger 35 to pump a certain amount of fluid from the secondary or brake cylinder side to the primary or master cylinder side. Upon the releasing of the brakes, and prior to the return of the parts to the position shown in Figure 1, the plunger 35 is arrested by contact with the plate 12. Continued movement of the plunger 25 back to its normal position then causes displacement of fluid in the chamber 37 past the valve 40 into the chamber 38, or the primary side of the adjuster, the valve 32 being closed.

In the next brake application, when the plunger 25 moves to the right, the plunger 35 momentarily remains stationary and thus moves relatively out of the chamber 37 due to the force of the spring 44, until the snap ring 45 contacts the seat 48, and during such relative movement of the plunger 35 out of the chamber 37, fluid is drawn into the chamber 37 through the check valve 32.

Thus, while relief valve means (32, 40) are provided to relieve excessive hydraulic pressures caused by dragging brakes, the proper adjustment of the correct amount of fluid released from the brakes is effected by the pumping mechanism during each brake application. The relief valves, as such, merely constitute a safety feature and are not ordinarily needed.

As previously stated, mechanical devices have been developed for effecting self-adjustment of the brake shoes of a vehicle. Such devices, however, are open to two serious objections. In the first place it is necessary to build the devices into the brake drums, thus rendering installation expensive and requiring a separate device for each wheel. Only one of the present devices need be employed for the usual four wheels of a motor vehicle, thus rendering it less expensive to manufacture. Moreover, it merely is necessary to tap into the brake line at any desired point and attach the present device with conventional fittings, and accordingly the present device need not be built in or designed with respect to other elements of the brake structure.

There is a second serious objection to conventional brake adjusting. All such adjusters are designed to permit movement of the brake shoes only a predetermined distance from the drums when the brakes are released. When it is necessary to use the brakes excessively, as when descending long hills, the brake drums become heated and expand radially to a substantial extent. When the brakes are released, the shoes move a predetermined distance from such expanded drums. When the drums contract to normal size, they engage the shoes with substantial pressure and thus cause a dragging of the brakes with a consequent excess wearing of the brake shoes. The releasing of the shoes from the drums is positively prevented, or strongly frictionally opposed by the brake adjusters and is not affected in any way in hydraulic brake mechanisms by the means employed for maintaining residual pressures in the brake cylinders.

In the form of the invention shown in Figure 3, there is a normal clearance at the point 70, but this clearance is promptly closed and sealed by the O ring 71 as soon as the plunger starts to move to the right upon the introduction of fluid through the pipe 17. Fluid trapped in the chamber 69 is free to escape through passage 81, the valve ring 86 opening whenever pressure in the chamber 69 overbalances the pressure in the inlet line 17.

The plunger 65 is free to move to a point corresponding to the brake-applied position of the plunger 25 in Figure 2. In other words, the left hand end of the plunger 65 and the O ring 76 act in effect as valve elements which assume approximately a lapped position wherein whatever fluid necessary for full brake application is permitted to flow through the clearance 66.

When the brakes are released, fluid is free to move from the brake line 21 into the chamber 60 and since the chamber 69 is now sealed both by the ring 71 and by the seating of the valve ring 86, a vacuum will be created in the chamber 69. This vacuum tends to prevent return movement of the plunger 65 to normal position. However, the fluid in the chamber 60, by virtue of the force of the brake release springs in the brake cylinders, develops pressure against the right hand end of the body of the plunger 65 as viewed in Figure 3, and this pressure, assisted by the spring 75, exerts a force to the left against the plunger 65 several times greater than that necessary to break the vacuum in the chamber 69. Accordingly the plunger 65 will be positively moved to the left. When the plunger 65 has moved to a point adjacent its normal position, the ring 71 will move out of contact with the walls of the chamber 69 and fluid in the chamber 60 will rush into the chamber 69 to satisfy the vacuum therein.

In the fully applied brake position, the volume of the chamber 60 will be displaced into the wheel cylinders plus whatever fluid flows around the plunger 65 when the latter passes the O ring 76, the plunger 65 being movable past the O ring 76 as is true of the plunger 25 in Figure 2 with respect to its ring 28. On the return movement of the parts, the expanding capacity of the chamber 60 will draw thereinto a volume of fluid equal to the maximum capacity of such chamber, and the chamber 69 will draw additional fluid thereinto when the seal 71 is released from the bore or chamber 69. Accordingly an ample volume of fluid will be withdrawn from the wheel cylinders to prevent contact of the shoes with the drums.

The device shown in Figure 3 is adapted to function much in the same manner as that shown in Figures 1 and 2 to relieve contact between the brake shoes and drums if the latter contract into engagement with the shoes. By pumping up and down on the brake pedal several times through a short distance, fluid may be displaced from the chamber 69 through the passage 81 and upon return movement of the parts to normal position fluid will flow from chamber 60 into chamber 69. Several such brake pedal movements accordingly will withdraw sufficient brake fluid from the brake cylinders to insure the relieving of all contact between the brake shoes and drums.

The form of the device in Figure 4 has been illustrated as one possible embodiment of the device, but it is not preferred since it requires a special formation of the brake cylinders and requires the use of one of the devices for each vehicle wheel. The springs 115 and 116 tend to hold the plunger 112 in the normal position shown. When the brakes are applied, fluid flows through pipe 109 to move the plunger 112 and thus displace through opening 106 a volume of fluid corresponding to that entering the device through pipe 109. After the plunger 112 passes the O ring 118, fluid can pass around the clearance space 113 to whatever extent may be necessary for full brake application.

Fluid entering the chamber 105 forces the pistons 96 apart to move the rods 97 and apply the brakes in the usual manner. When the brakes are released, the return springs move the pistons 96 toward each other to displace fluid from the chamber 105 through opening 106 to return the plunger 112 to its normal position. If excess pressure occurs in the chamber 105, the plunger 112 will move downwardly as viewed in Figure 4, past the O ring to release the excess pressure until the desired residual pressure is reestablished. While the particular installation in Figure 4 is not preferred, the plunger 112 is adapted to function not only to displace fluid into the brake cylinder, but also to release excess pressure if it is built up in the brake cylinder.

Normally, the plunger 112 returns to the position shown in Figure 4 to release the brake shoes for a predetermined movement away from the brake drum. Any tendency for the plunger 112 to move beyond its normal position results in reducing the loading of the spring 115 and increasing the loading of the spring 116 to oppose such action. Movement of the plunger 112 beyond its normal position can occur, therefore, only if excessive pressure is established in the chamber 105 due to the contraction of the brake drums after the latter have been unduly expanded. The device in Figure 4, therefore, is adapted to act not only as a brake adjuster but also as a residual pressure valve. The device shown in Figure 4, however, does not permit manual withdrawing of fluid from the brake cylinder as is true of the forms of the invention shown in Figures 1 and 2.

The device is shown in Figure 5 in a specific installation to function both as a brake adjuster and as a residual pressure valve. It will be noted that the usual residual pressure valve is eliminated from the master cylinder in Figure 5. The brakes are applied by depressing the brake pedal (not shown) to move the piston 128 toward the left to displace fluid through passage 141. The pressure built up to the right of the plunger 145 moves this plunger to the left in engagement with the O ring 147. When the plunger 145 passes the ring 147, fluid can flow through the clearance space 146 until full brake application has been effected by the introduction of fluid into the brake cylinders 163.

When the brakes are released, fluid will be displaced from the brake cylinders 163 by action of the brake shoe return springs and will effect movement of the plunger 145 to the right in Figure 5. The plunger 145 immediately engages the ring 147 to prevent passage of fluid through clearance space 146. The amount of fluid permitted to return from the brake cylinders accordingly will correspond to the capacity of the chamber 153 when the latter is at its maximum, namely, with the plunger 145 contacting with the washer 151. Thus there is again provided a measured predetermined movement of the brake shoes away from the brake drums to eliminate the necessity for manual adjustment of the brakes.

The spring 156 is of such tension as to retain the ball 155 seated against the desired residual pressure in the brake lines. If such pressure increases, for example upon contraction of the brake drums after they have expanded, the ball 155 will unseat and thus relieve such excessive pressure as in certain of the forms of the invention previously described. It will be noted, therefore, that the device is capable of use directly with the master cylinder to function both as a brake adjuster and as a residual pressure valve. As in the case of the usual residual pressure valve, the present device permits unlimited fluid to be forced into the brake lines while normally measuring the returning amount of fluid to limit the clearance between the brake shoes and drums. However, the valve 155 functions under all conditions in the same manner as a conventional residual pressure valve to prevent undue accumulation of pressure in the brake lines.

From the foregoing it will be apparent that each form of the invention functions to measure the amount of fluid which is permitted to return from the brake cylinders after each brake application. Thus the shoes are prevented from returning to a fixed predetermined position as is conventional and return rather to a normal position which varies constantly as wear on the brake shoes takes place. Certain of the devices are adjustable as to the amount of fluid which is permitted to return and all forms of the device may be made similarly adjustable. For example, movement of the parts in Figures 1 and 2 is limited by engagement of the small plunger 25 with the plate or washer 12 and this washer may be of any additional thickness, projecting into the cylinder 10, as suggested in dotted lines in Figure 2, to predetermine the distance of return movement of the plunger 25 when the brakes are released. The same is true of the washer 151 in Figure 5.

The device is therefore not only highly advantageous over mechanical brake adjusters for the reasons stated, but also is adapted to serve as a residual pressure valve, and the adjustment of the return movement of the plunger permits the same size device to be used on vehicles with varying brake systems. The device also is highly advantageous for an additional and wholly non-obvious reason. As previously stated, the device may be arranged in the outlet of any conventional type of booster brake mechanism to normally govern the quantity of fluid returning to the high pressure end of the booster and thus normally determine the clearance between the brake shoes and the brake drums. In the manufacture of booster brake mechanisms it has been necessary to make such mechanisms in a substantial variety of sizes to take care of different brake installations and to insure the maximum necessary displacement of hydraulic brake fluid for applying the brakes as the brake shoes become worn. The use of the present device in metering the flow of hydraulic brake fluid makes it unnecessary for booster brake mechanisms to take care of maximum demands as under present conditions since it is never necessary for such mechanisms to supply more liquid than is predetermined by movement of the plunger of either form of the present device plus whatever minor quantity of fluid is necessary to compensate for leakage. The use of the present device with booster brake mechanisms accordingly reduces the number of different sizes and designs of such mechanisms which need be manufactured.

In each case, the plunger is normally sealed by an O ring and is adapted to assume a position in lapped relationship therewith for the escape past the plunger of whatever fluid may be necessary for full brake application. Therefore the present device does not in any sense limit the supply of fluid to the brake cylinders. However, the device normally limits the withdrawal of fluid from the brake cylinders, thus limiting the distance of movement of brake shoes away from the drums. If conventional brake shoe return springs are employed, it will be necessary that the springs 44 (Figure 1), 88 (Figure 3), 116 (Figure 4) and 156 (Figure 5) be sufficiently strong to withstand the substantial pressure which would be generated by the return springs. The present system permits the use of relatively weak return springs, as stated, and thus the brake shoe return springs are wholly depended upon to generate and predetermine the residual pressure. Such pressure is normally generated by the strong return springs customarily used, but the residual pressure is not determined by such springs since they move the brake shoes into engagement with stop elements. The residual pressure is normally determined by the master cylinder valves provided for this purpose. The combination of the present device with return springs of proper tension for the brake shoes predetermines the distance of movement of the shoes from the drums and depends solely on the return springs for generating the residual pressure.

As previously stated, where a single device of the present type is used in the main hydraulic fluid supply line, it is necessary that all of the return springs 168 be of fairly equal tension. It will be obvious that if any one return spring should exceed the tension of the other springs, the strongest spring would predetermine the residual pressure in the system and would maintain the brake shoes associated with the other return springs in engagement with the brake drums. However, present methods of manufacturing springs have been so highly developed as to accuracy that return springs which are reasonably identical with each other readily may be obtained. Actually, a variation of one pound between the minimum and maximum tensions of the various springs 168 is practicable since the brake shoes associated with the weaker springs would be held in very light contact with the brake shoes. It is entirely possible, however, to obtain return springs which vary only to the slightest extent from each other.

As previously stated, the brake return springs 168 are solely depended upon to generate the residual pressure in the system. The present device requires no stop means to limit movement of the brake shoes away from the drums. The brake shoes themselves, therefore, are movable away from the brake drums an indeterminate distance, but such distance is predetermined by the metering of the return of fluid from the brake cylinders by the present device and when the return flow of fluid is stopped by the metering device, the return springs 168 determine the residual pressure.

I claim:

1. For use in a hydraulic braking system having brake-applying means, and means for supplying hydraulic brake fluid under pressure to said brake-applying means to apply the brakes, a brake control device comprising a metering device to limit to a predetermined quantity the amount of hydraulic fluid returning from said brake-applying means upon the releasing of pressure in the fluid-supplying means, and pumping means for bleeding a relatively small amount of fluid from said brake-applying means to the fluid supplying means upon each operation of the brake-applying means.

2. For use in a hydraulic vehicle braking system having a brake-applying device, a fluid pressure generating device and a hydraulic line connecting said fluid pressure reducing device and said brake-applying device, a metering device in said hydraulic line and comprising a member movable in one direction when hydraulic fluid is transferred from said pressure-generating device to said brake-applying device and movable in the opposite direction when the pressure in said pressure-generating device is released, said movable member being operative in said first direction of movement to render said fluid pressure generating device operative for transmitting to said brake-applying means a quantity of hydraulic fluid uncontrolled by said movable member, said movable member being operative in its second-named direction of movement for metering the amount of fluid returning from said brake-applying device to said fluid pressure generating device, and a pump carried by said movable member and automatically operative once during each movement thereof in said first-named direction and in said second-named direction for transferring a small amount of hydraulic fluid from said brake-applying device to said fluid pressure generating device.

3. For use in a hydraulic vehicle braking system having a brake-applying device, a fluid pressure generating device and a hydraulic line connecting said fluid pressure reducing device and said brake-applying device, a metering device in said hydraulic line and comprising a member movable in one direction when hydraulic fluid is transferred from said pressure-generating device to said brake-applying device and movable in the opposite direction when the pressure in said pressure-generating device is released, said movable member being operative in said first direction of movement to render said fluid pressure generating device operative for transmitting to said brake-applying means a quantity of hydraulic fluid uncontrolled by said movable member, said movable member being operative in its second-named direction of movement for metering the amount of fluid returning from said brake-applying device to said fluid pressure generating device, and a pump carried by said movable member and automatically operative once during each movement thereof in said first-named direction and in said second-named direction for transferring a small amount of hydraulic fluid from said brake-applying device to said fluid pressure generating device, said pump including valve means automatically operative when the pressure in said brake-applying device exceeds to a predetermined extent the pressure in said fluid pressure generating device to provide for the transfer of hydraulic fluid from said brake-applying device to said fluid pressure generating device.

4. In combination, a hydraulic braking system comprising brake-applying means, hydraulic fluid pressure producing means hydraulically connected thereto, a brake element operable by said brake-applying means, a rotatable element engageable by said brake element, said brake element being biased away from said rotatable element and movable therefrom an indeterminate distance, an automatic brake adjuster having fluid displacing means interposed between said pressure producing means and said brake-applying means, means to effect a by-pass of fluid from said pressure-producing means to said brake-applying means when said fluid displacing means has moved a predetermined distance in one direction, and means responsive to movement of said fluid-displacing means to pump a relatively small amount of fluid from said brake-applying means to said pressure-producing means.

5. In combination, a hydraulic braking system having a pressure-producing device, a brake element, a wheel cylinder to receive pressure fluid from said pressure-producing device to actuate said brake element, a drum engageable by said brake element, resilient means biasing said brake element away from said drum, said brake element being movable from said drum an indeterminate distance whereby said resilient means predetermines the residual pressure in the braking system, a casing interposed between said pressure producing means and said brake cylinder, a member in said casing having a normal position from which it is movable by fluid from said pressure producing means to displace fluid into said brake cylinder, means for effecting a leakage of fluid past said movable member to said wheel cylinder after a predetermined amount of fluid has been displaced into said wheel cylinder by said movable member, and pumping means operative when said movable member is actuated to transfer a small amount of fluid from said wheel cylinder to said pressure-producing means.

6. The combination defined in claim 5 provided with a relief valve to limit residual pressure to the maximum predetermined by said resilient means.

7. A hydraulic brake control device comprising a cylinder adapted to be arranged in a hydraulic brake line and having inlet and outlet ends communicating with such lines, a main plunger in said cylinder having clearance with respect to the inner wall thereof and normally arranged at a limit of movement toward said inlet end and being movable toward said outlet end, a sealing ring carried by said cylinder and engaging said main plunger until the latter approaches said outlet end, whereupon such plunger becomes free of said sealing ring for the flow of hydraulic fluid from said inlet end to said outlet end through said clearance, said main plunger having a plurality of successive axial bores communicating with each other and with said inlet and outlet ends, an auxiliary plunger within said main plunger, a ball check valve normally closing communication through one of said bores, a spring arranged between said auxiliary plunger and said check valve to normally retain the latter seated toward said outlet end, a spring arranged in one of said bores and seated with repsect to said auxiliary plunger, and a second check valve controlling communication through said bores and urged to closed position toward said outlet end by said second-named spring.

8. A hydraulic brake control device comprising a main cylinder adapted to be connected at its ends in a hydraulic brake line, one end of said main cylinder comprising an inlet end, said main cylinder being provided with a metering chamber portion and with an outlet chamber communicating with said metering chamber portion and with said brake line, a plunger reciprocal in said main cylinder and normally occupying a position adjacent said inlet end, said main cylinder having an axial auxiliary cylinder and said plunger having an axial extension projecting partly into and having clearance with said auxiliary cylinder when said plunger is in said normal position, an auxiliary sealing ring carried by said axial extension and movable into said auxiliary cylinder to close said clearance upon initial movement of said plunger from normal position, and a main sealing ring carried by said main cylinder and engaging said plunger when the latter is in its normal position and throughout the greater portion of the travel of said plunger toward said auxiliary chamber, said plunger being movable toward said auxiliary chamber to such an extent that it wholly clears said main sealing ring and having clearance relative to the walls of said main cylinder for the movement of fluid past said plunger when the latter passes said main sealing ring, said plunger having an axial passage communicating at its opposite ends with said inlet end and with said auxiliary cylinder, and a spring pressed check valve controlling said axial passage and seating toward said auxiliary cylinder.

WILLIAM STELZER.

REFERENCES CITED

The following references are of record in the file of this patent:

UNITED STATES PATENTS

| Number | Name | Date |
|---|---|---|
| 697,140 | Goldschmidt | Apr. 8, 1902 |
| 1,885,580 | Bradbury | Nov. 1, 1932 |
| 2,345,811 | Harp | Apr. 4, 1944 |
| 2,385,625 | Hopmans | Sept. 25, 1945 |
| 2,406,178 | Walley, Jr. | Aug. 20, 1946 |

FOREIGN PATENTS

| Number | Country | Date |
|---|---|---|
| 1,570 | Great Britan | 1861 |
| 157,887 | Austria | Feb. 10, 1940 |
| 358,126 | Great Britain | Oct. 8, 1931 |